United States Patent
Reichler

(10) Patent No.: US 9,200,703 B2
(45) Date of Patent: Dec. 1, 2015

(54) METHOD AND APPARATUS FOR CONTROLLING AN AUTOMATIC TRANSMISSION

(71) Applicant: Bayerische Motoren Werke Aktiengesellschaft, Munich (DE)

(72) Inventor: Matthias Reichler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/501,990

(22) Filed: Sep. 30, 2014

(65) Prior Publication Data

US 2015/0094921 A1    Apr. 2, 2015

(30) Foreign Application Priority Data

Oct. 1, 2013   (DE) .......................... 10 2013 219 970

(51) Int. Cl.
*F16H 61/02* (2006.01)

(52) U.S. Cl.
CPC ...... *F16H 61/0213* (2013.01); *F16H 2061/022* (2013.01)

(58) Field of Classification Search
CPC .................. F16H 59/0204; F16H 2059/0239; F16H 2059/0252; F16H 61/0248
USPC ..................................................... 701/51, 52
See application file for complete search history.

(56) References Cited

U.S. PATENT DOCUMENTS

| | | | |
|---|---|---|---|
| 6,474,187 B1 | 11/2002 | Vollmar | |
| 7,555,967 B2 * | 7/2009 | Terayama et al. | 74/336 R |
| 2002/0058566 A1 | 5/2002 | Heim | |
| 2002/0095250 A1 * | 7/2002 | Yeo | 701/55 |
| 2003/0045399 A1 | 3/2003 | Lee | |
| 2004/0266583 A1 * | 12/2004 | Henneken et al. | 477/34 |
| 2014/0116178 A1 * | 5/2014 | Sata | 74/473.31 |

FOREIGN PATENT DOCUMENTS

| | | |
|---|---|---|
| DE | 100 52 881 A1 | 5/2002 |
| DE | 102 22 401 A1 | 4/2003 |
| DE | 103 28 313 A1 | 1/2005 |
| DE | 10 2006 025 625 A1 | 12/2007 |
| DE | 199 26 823 B4 | 8/2008 |

OTHER PUBLICATIONS

German Office Action dated Mar. 20, 2014 (Four (4) pages).

* cited by examiner

*Primary Examiner* — Edwin A Young
(74) *Attorney, Agent, or Firm* — Crowell & Moring LLP

(57) ABSTRACT

In a motor vehicle, the shifting characteristics for kick-down shifting for gear selection in the sense of a kick-down simulation are activated by at least one selection device by which the gears of the transmission can be manually shifted up and down in a manual mode, and by an electronic control unit that predetermines a gear selection for controlling the setting elements of the transmission as a function of the signals of the selection devices, of shifting characteristics, and of further input signals. For kick-down shifting, the further input signals are the activation of the selection device into the down-shift position that requests manual down-shifting and the holding of the selection device in this down-shift position for a predetermined period of time.

5 Claims, 1 Drawing Sheet

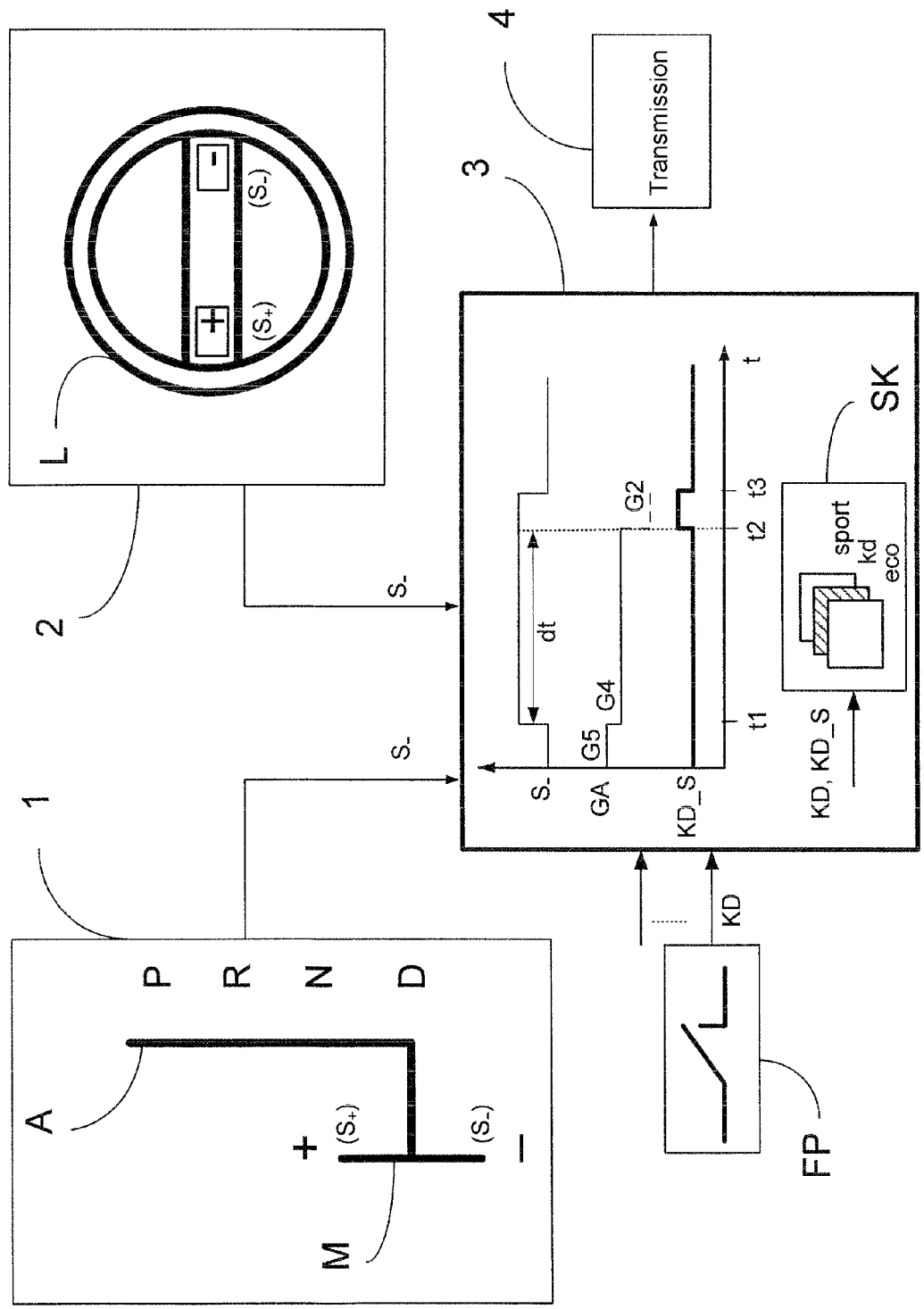

METHOD AND APPARATUS FOR CONTROLLING AN AUTOMATIC TRANSMISSION

CROSS REFERENCE TO RELATED APPLICATIONS

This application claims priority under 35 U.S.C. §119 from German Patent Application No. 10 2013 219 970.8, filed Oct. 1, 2013, the entire disclosure of which is herein expressly incorporated by reference.

BACKGROUND AND SUMMARY OF THE INVENTION

The invention relates to a method and apparatus for controlling an automatic transmission for a motor vehicle having at least one selection device by which the gears of the transmission can be manually shifted up and down in a manual mode, and an electronic control unit that predetermines a gear selection for controlling setting elements of the transmission. The electronic control unit predetermines the gear selection as a function of the signals of the selection device, shifting characteristics, and further input signals.

Such an apparatus is known to the applicant from its own patent application DE 10 2006 025 625 A1, for example. This known apparatus has a first selection device in the form of a selection lever, with which the gears P, R, N, D that can be set in automatic mode can be determined. Using a second selection device in the form of a steering wheel having two switches, the gears of the transmission can be manually shifted up or down, step by step, in manual mode. This known apparatus has an electronic transmission control unit that is usual in the case of automatic transmissions or automated manual transmissions.

In the known method, a first down-shift is undertaken, when at least the second selection device is activated into the manual down-shift position and the selection device is held in this down-shift position, by an electronic control device that controls the setting elements of the transmission as a function of the signals of the selection devices and further input signals. Subsequently, if the selection device is held in the down-shift position for a longer time, further down-shifts are performed sequentially, if a maximal permissible speed of rotation of the drive motor is not exceeded during each further down-shift.

For this purpose, the selection device is configured in such a manner that not only tapping but also holding of the selection device in a specific position can be detected. The detected position is reported to the control device, which is configured to evaluate the detected position, to undertake monitoring of the speed of rotation of the drive motor, and, in accordance with the method according to the invention, to cause the down-shifts to take place, if applicable also in a time-controlled manner.

These sequential multiple down-shifts require relatively long shifting times.

It is the object of the invention to provide an improved method and apparatus for controlling an automatic transmission with regard to faster driving dynamics desired by the driver.

This and other objects are achieved according to the invention, wherein the shifting characteristics for kick-down shifting for gear selection, in the sense of a kick-down simulation, are activated in the motor vehicle by the at least one selection device, by which the gears of the transmission can be manually shifted up and down in manual mode, and by an electronic control unit that predetermines a gear selection for controlling the setting elements of the transmission as a function of the signals of the selection device, of shifting characteristics, and of further input signals when the selection device is activated into the down-shift position that requests manual down-shifting and the selection device is held in this down-shift position for a predetermined period of time. The kick-down simulation can be maintained in a time-controlled or event-controlled manner.

The invention can be used both in a permanent manual mode and in a temporary manual mode. The permanent manual mode (M mode) can be activated by way of a selection lever, for example, when this is changed from a D position to an M position. The D position is usually assigned to an automatic mode, and the M position is assigned to a manual mode. The temporary manual mode permits manually triggered down-shifts or up-shifts, proceeding from the activated automatic mode, in other words even if the selection lever remains in the D position, for example if special down-shift and up-shift keys (e.g. switches or paddles on the steering wheel) are activated. This already corresponds to the state of the art.

The invention generally achieves very fast down-shift performance, if a down-shift key (e.g. the minus paddle already present in BMW vehicles with automatic transmissions) is activated for a longer period of time, by means of preconditioning of the gear selection into the shortest possible gear. In this connection, in contrast to actual activation of the kick-down switch on the gas pedal, no compulsory torque increase takes place.

This preconditioning of the gear selection is achieved, according to the invention, by way of simulation of a kick-down within the transmission control device, but only with reference to the selection of the shifting characteristics provided for kick-down. A torque increase in the drive machine (internal combustion engine or electric motor) does not necessarily take place. This kick-down simulation according to the invention is achieved with only one operating step, namely if the down-shift key (as an example of a second selection device) is activated for a longer period of time.

For example, in this connection, longer holding of the down-shift key in the down-shift position—in contrast to a short shifting command for only one down-shift—can be recognized by a timer-controlled evaluation. After this timer elapses, a trigger signal simulates a "kick-down=active" signal within the control device, independent of activation of the gas pedal and of the actual kick-down switch.

The shifting characteristics thereby selected for the usual kick-down shifts can thereupon preferably be maintained until the down-shift key is released or the down-shift position is departed from. However, other exit criteria from the kick-down simulation, such as a further time control, can also be defined.

Shifting in the sense of a shift request is initiated by way of the software-side linking of the "true" kick-down signal input of the control unit with this "kick-down=active" signal recognition simulated by the software, from the timer-controlled recognition of long pressing of a down-shift key; i.e. a gear selection takes place as a request and thereby independent of the possibilities of actual implementation in the transmission. The shortest possible gear that is permissible or possible in accordance with other general conditions (e.g. over-revving of the drive motor) is predetermined in accordance with the kick-down shifting characteristics.

The advantage of the invention lies in the simplicity of its implementation, because the kick-down gear selection thresholds are used for finding the gear, and therefore no separate further software-side thresholds (limit speeds of rotation, limit speeds, etc.) have to be used for the gear selection.

Fundamentally, the "kick-down=active" recognition signal simulated by the software would also be possible by way of representation by way of suitable hardware-side shifting.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic diagram of an apparatus for controlling an automatic transmission of a motor vehicle according to an embodiment of the invention.

DETAILED DESCRIPTION OF THE DRAWINGS

FIG. 1 shows an apparatus for controlling an automatic transmission 4 of a motor vehicle equipped with a first selection device 1 in the form of a selection lever, not shown, moveable in at least one channel (first channel) for determining the gears P, R, N, and D that can be set in automatic mode. Furthermore, a second selection device 2 in the form of an up-shift key (+ key) and a down-shift key (− key) is shown, by which the gears of the transmission can be manually shifted up or down, particularly step-by-step. The selection device 1 can also be activated in manual mode M, into a down-shift position (−) and into an up-shift position (+). The up-shift and down-shift keys can be provided on the steering wheel L, for example, in the form of shifting paddles.

Furthermore, an electronic control unit 3 is provided, which receives different input signals, including the signals of the accelerator (gas) pedal FP (with kick-down switch KD) and of the selection devices 1 and 2. The setting elements of the automatic transmission 4 for changing and setting predetermined gears are controlled as a function of these input signals, by use of a programmed shifting logic.

If the selection device 2 is brought into a down-shift position "−" in that the down-shift key is activated, or if the selection device 1 is brought into a down-shift position "−" in that the selection lever is moved in the "−" direction in the second channel, a signal S_ is generated, in each instance. If this signal S_ is applied for a predetermined period of time dt, "long pressing" of the selection device 1 or 2 in the down-shift position "−" is recognized. Thereupon, a kick-down simulation signal KD_S for activation of the shifting characteristics kd is generated from the various shifting characteristics SK stored in memory.

In the case of a down-shift command S_ starting at the point in time t1 and holding (S_=1) of the selection device 1 or 2 in the down-shift position by the driver, at first a first down-shift by one gear, for example proceeding from $5^{th}$ gear to $4^{th}$ gear, can be undertaken, or not. If the selection device 1 or 2 continues to be held in the down-shift position, a gear selection in accordance with the kick-down characteristics kd, here, for example, direct down-shifting from $5^{th}$ or $4^{th}$ gear to $2^{nd}$ gear, is undertaken after the time window dt has elapsed, at the point in time t2. If the down-shift position is departed from and if the signal S_ thereby becomes zero again, here the kick-down simulation is also deactivated at the point in time t3 (KD_S also becomes zero again).

By way of this invention, the performance wishes of the driver, on the one hand, and, on the other hand, also the requirements for optimal convenience with regard to easy operation, are taken into account.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an automatic transmission of a motor vehicle equipped with at least one selection device by which gears of the transmission are manually shiftable up and down in a manual mode and an electronic control unit that predetermines a gear selection for controlling setting elements of the transmission, the method comprising the acts of:
   predetermining, via the electronic control unit, the gear selection as a function of signals of the at least one selection device, shifting characteristics, and additional input signals; and
   activating shifting characteristics for kick-down shifting for the gear selection in a sense of a kick-down simulation when the selection device is activated into a down-shift position that requests a manual down-shifting and the selection device is held in the down-shift position for a predetermined period of time.

2. The method according to claim 1, wherein the kick-down simulation is performed until the selection device is deactivated out of the down-shift position.

3. A method for controlling an automatic transmission of a motor vehicle, the method comprising the acts of:
   activating a selection device in a down-shift position signaling a request for manual down-shifting;
   maintaining the selection device in the down-shift position for a predetermined period of time; and
   wherein the activating of the selection device and the maintaining of the selection device in the down-shift position for a predetermined period of time activates shifting characteristics for a kick-down shifting for performing gear selection in a kick-down simulation.

4. An automatic transmission control apparatus for a motor vehicle, comprising:
   at least one selection device by which gears of a transmission are manually shiftable up and down in a manual mode;
   an electronic control unit, the electronic control unit having shifting characteristics by which a gear selection for controlling setting elements of the transmission is determinable as a function of signals of the selection device and as a function of additional input signals; and
   wherein the electronic control unit includes a function module for kick-down simulation such that when the selection device is activated into a down-shift position and held in the down-shift position for a predetermined period of time, the shifting characteristics for kick-down shifting for the gear selection are activated.

5. The apparatus according to claim 4, wherein the kick-down simulation is deactivated if the selection device is deactivated out of the down-shift position.

* * * * *